Feb. 11, 1964 E. G. BOITOS 3,121,037

PROCESS AND APPARATUS FOR PREPARING ROTOGRAVURE PLATES

Filed May 19, 1959 4 Sheets-Sheet 1

INVENTOR.
EMIL G. BOITOS
BY
Burton & Parker
ATTORNEYS

PROCESS AND APPARATUS FOR PREPARING ROTOGRAVURE PLATES

Filed May 19, 1959 4 Sheets-Sheet 2

INVENTOR.
EMIL G. BOITOS
BY
Burton & Parker
ATTORNEYS

PROCESS AND APPARATUS FOR PREPARING ROTOGRAVURE PLATES

Filed May 19, 1959 4 Sheets-Sheet 3

INVENTOR.
EMIL G. BOITOS
BY
Burton & Parker
ATTORNEYS

PROCESS AND APPARATUS FOR PREPARING ROTOGRAVURE PLATES

Filed May 19, 1959 4 Sheets-Sheet 4

INVENTOR. 102
EMIL G. BOITOS
BY Burton & Parker
ATTORNEYS

United States Patent Office 3,121,037

Patented Feb. 11, 1964

3,121,037

PROCESS AND APPARATUS FOR PREPARING ROTOGRAVURE PLATES

Emil G. Boltos, Roseville, Mich., assignor to Detroit Gravure Corporation, Detroit, Mich., a corporation of Michigan Filed May 19, 1959, Ser. No. 815,771
24 Claims. (Cl. 156—14)

This invention relates to improvements in the preparation of rotogravure printing plates and particularly to that step in the process of etching the plates through the resist sheet affixed thereto, and to an improved process and apparatus for carrying out the same.

This application is a continuation-in-part of my application Serial No. 736,170, filed May 19, 1958, now abandoned.

It also relates particularly to the preparation of rotogravure plates wherein the plate to be etched is prepared to print a design which exhibits a large number of widely varying tones of dark and light and which shade off gradually one into the other.

It is conventional practice in the preparation of the copper surface of a rotogravure printing cylinder to affix the exposed gelatine tissue to the copper-coated surface of the cylinder and to paint out or lacquer those areas of the surface of the cylinder not covered by the tissue resist. It is understood that as a result of the exposure of the sensitized tissue, the resist exhibits areas which vary in hardness or resistance to penetration by the etching solution as the printing to be reproduced varies in tone from light to dark, and that the resist also exhibits screen line areas throughout which it is highly resistant to penetration by the etching solution. In rotogravure etching the etchant is an aqueous solution of ferric chloride, referred to in the trade as "etching acid," presumably because of its acidic properties. Herein it is referred to as "acid etching solution" or simply "etching solution."

The cylinder carrying the prepared resist is commonly supported for rotation over an etching solution tank and is etched by an operator applying by hand an acidic etching solution thereto in successive applications and wherein the strength of the solution is decreased from time to time. It is understood that this work is preferably carried out in an air conditioned room and that it is presently common practice to provide a plurality of vessels or pots of etching solution of varying concentrations. These pots are disposed adjacent to the solution collection tank and available to the operator. For example, one pot might contain solution of 44° Bé., a second pot solution of 43° Bé., a third pot solution of 42° Bé., another solution of 41° Bé., another solution of 40° Bé., another 39° Bé., etc., as desired.

During rotation of the cylinder the operator first applies solution of the maximum concentration, say 43° Bé. to the resist-covered surface of the rotating cylinder for a determined period of time, say two minutes. Such solution is commonly applied with a suitable swab, the operator wiping the same over the resist with the swab. Successive applications of diminished concentration of acidic etching solution are applied for predetermined periods of time. Such successive applications might vary from the 43° Bé. concentration to a low of 39° Bé. concentration. Each concentration will be applied for a determined time period.

As is well understood, those areas of the cylinder surface covered by the least resistant areas of the resist are first etched and are etched for the maximum time and to the deepest extent. Those areas of the cylinder surface covered by the more resistant areas of the resist are etched less and for shorter periods of time. It is understood that the weaker the solution, the more easily it penetrates the tissue resist.

The conventional process just described proceeds by a series of steps of definite increments of gradation of etching inasmuch as the etcher applies the diminished concentrations of acidic etching solution in definite diminutions of concentration. The screen lines on the resist are sufficiently resistant to solution penetration so that the areas of the cylinder covered thereby are not etched. The etched cavities in the surface of the cylinder between the screen lines exhibit different depths and depths of the cavities differ from one another by more or less stepped gradations due to the stepped gradations in concentration of the different solutions. In the resulting printing from the cylinder, the variations in tone will therefore differ from one another by definite gradations which correspond with the gradations in depth of the cavities.

For smooth, even gradation, it is necessary to depend largely upon the skill of the operator in the manual application of acidic etching solution to determined areas of the resist to increase and/or decrease the etching. The wiping of the solution-carrying swab over the resist-covered surface of the cylinder, however, often results in reducing the width of some of the screen lines and may tend to cause copper particles or other refuse to collect in certain cavities. As a result of such collection and cavity filling, the printing which is produced from the cylinder may not exhibit the desired gradation of light and dark and the screen line faces may not stand out even and of uniform width. My process of etching is designed to overcome the above disadvantages.

An object of my process is to produce an etched surface on the copper wherein the cavities will vary uniformly and evenly in depth by infinitesimal degrees so as to more accurately represent the dark and light shades desired to be reproduced.

Another object is to provide a process wherein the screen grid will present more uniform and even width lines throughout and the edges of said screen lines will be even and free from ragged interruptions.

Another object is the provision of a process wherein the etched-out copper particles, used etching solution, and the like will not be permitted to collect in the cavities but will be washed from the interior thereof continuously during the etching process and the bottom and walls of the cavities will be kept smooth and clean so that the solution may act freely thereon and the cavities will develop the required depth.

Another object is to provide a process which is independent of the skill of the operator and which might be automatically carried out and one wherein unskilled operators may be employed and one operator might superintend the etching of a plurality of cylinders simultaneously.

Another object is the provision of an etching process of the character described wherein the acidic itching solution is continuously recirculated and discharged against the resist covered copper surface of the rotating cylinder, and during a predetermined period of time the concentration of solution is slowly continuously diminished from the maximum concentration to the minimum concentration and such is all automatically carried out. Preferably such decrease of concentration of the solution is accomplished by slowly continuously adding water to the solution throughout a determined time period. Variation in the time period may be used to automatically vary the character of the tone reproduction as desired.

Another object is that my process is such that if errors or mistakes have been made in earlier steps of the rotogravure process, which errors might have been corrected or overcome by a skilful operator withholding or increasing the application of etching solution to such areas of the resist, such errors or mistakes will thus not be manually corrected but will be exposed and therefore their cause may be determined and corrected at the source.

Another object is the provision of suitable apparatus for the carrying out of my improved process as hereinafter described.

Other objects, advantages, and meritorious features will more fully appear from the following specification, attached claims, and accompanying drawings, wherein:

FIG. 7 is a fragmentary transverse sectional view looking downwardly and taken along the line of the arrows 7—7 in FIG. 6;

FIG. 8 is a vertical sectional fragmentary view taken along the line 8—8 of FIG. 6;

FIG. 9 is a fragmentary sectional view taken in the direction of the arrow 9 of FIG. 6;

FIG. 10 is a vertical sectional view taken on the line 10—10 of FIG. 8;

FIG. 11 is a perspective of a fragment of the air discharge pipe shown in FIG. 8;

FIG. 12 is a vertical sectional view through the solution trough transversely thereof showing a portion of the superimposed roll and showing the action of the solution during operation.

Figure 1:
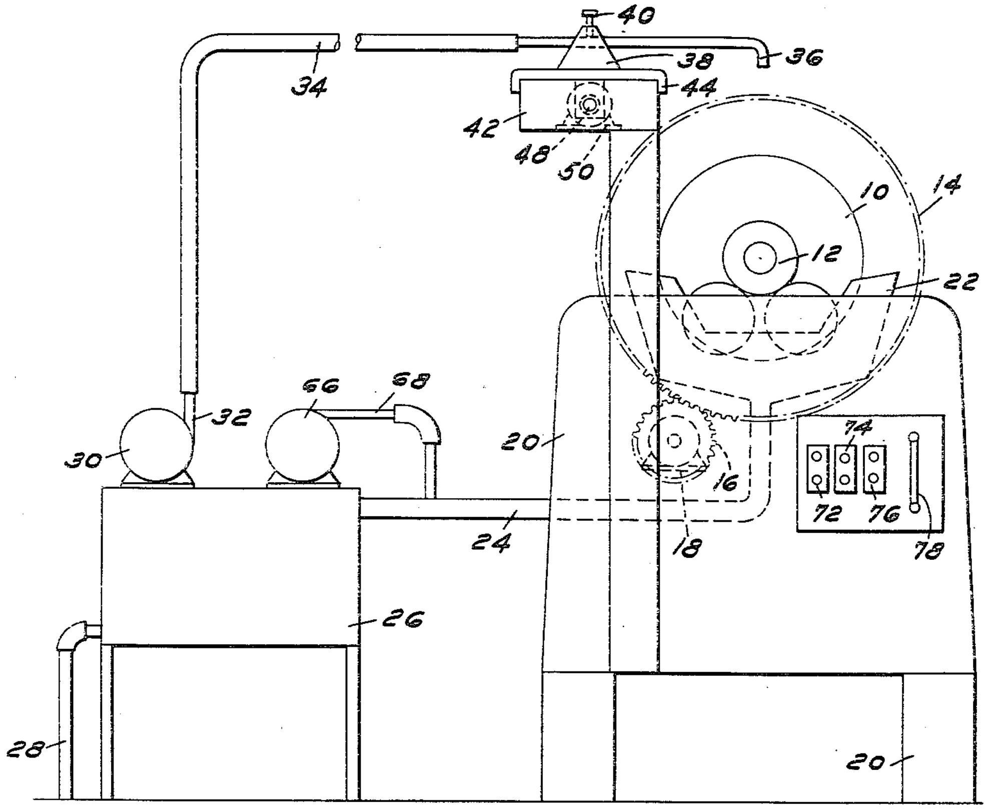
FIG. 1 is an end elevation of apparatus whereby the invention herein disclosed may be carried out.

In the etching of a printing roll or rotogravure printing, such rolls are commonly formed of metal and provided with a cylindrical copper surface receptive to etching by an acidic etching solution. A gelatin tissue resist is laid over the surface of the roll and spread evenly thereon. This resist of whatsoever character exhibits the design or picture desired to be printed and the gelatinized areas thereof have been hardened to various degrees of resistance to the solution by exposure. When it is desired to etch the roll it is suitably supported over a solution collection tank. In FIG. 1 such a roll is indicated as 10. It is provided at opposite ends with stub axles 12 one of which carries a detachable gear 14 which is adapted to be removably engaged with a drive pinion 16, which pinion is driven by a motor 18 mounted on a frame 20. Suitable control mechanism is provided to control the speed of rotation of the cylinder. The roll is removable from the frame.

In the construction shown in FIGS. 1–5 and the process carried out therewith, the frame 20 supports solution collection trough 22. The roll is supported within and overhanging the trough so that solution which is discharged upon the roll will flow over the surface and into the trough. A discharge pipe 24 leads from the trough 22 into a solution tank 26.

The solution tank 26 may be provided with a waste discharge pipe 28. A motor-driven pump 30 may be mounted on the tank as shown. This is of suitable conventional character. The pump has a discharge pipe 32 which leads through a flexible line 34 to a discharge outlet 36. This outlet 36 is shown in FIG. 1 as supported overhanging the cylinder 10. One or more of these discharge outlets may be provided.

Figures 4, 5:
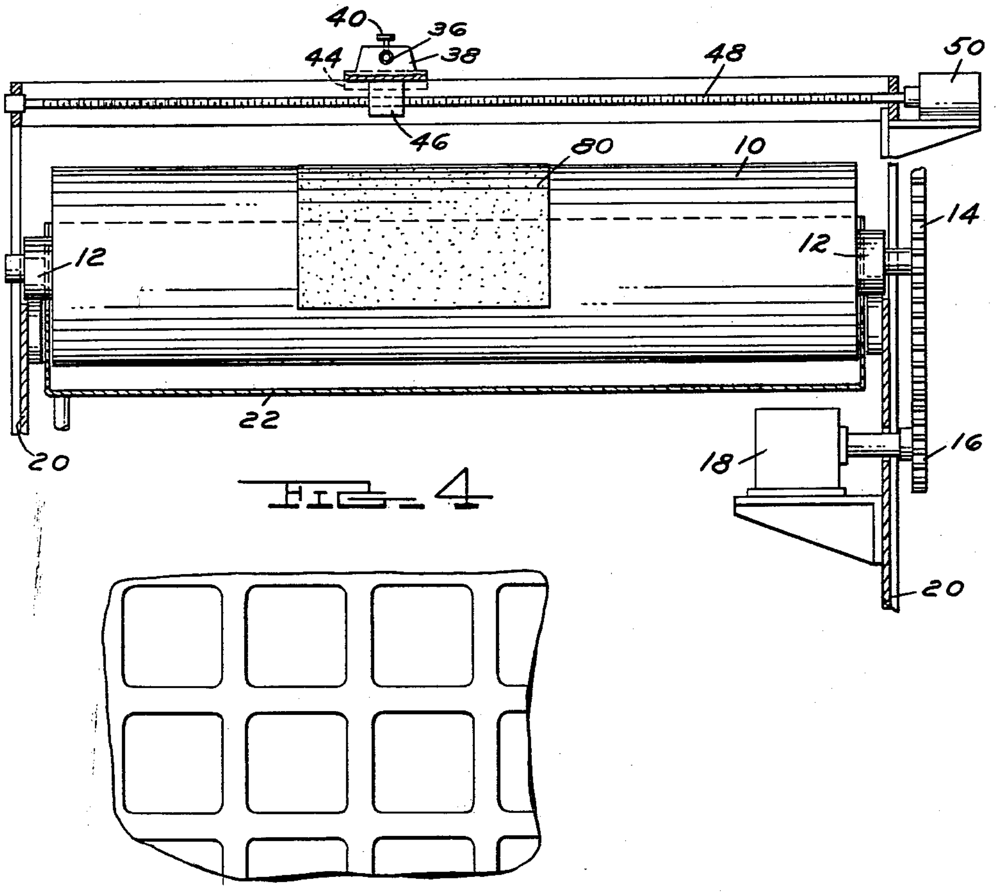
FIG. 4 is a side elevation partly in section of the apparatus shown in FIG. 1.
FIG. 5 is an elevation of a fragment of a printing roll following the completion of the etching thereon.

The discharge outlet 36 is directly supported by a bracket 38 and an adjustable clamping means 40 is provided whereby the outlet pipe 36 may be adjusted to the right or to the left as shown in FIG. 1 so as to discharge upon the forward or rearward half of the rotating cylinder. The clamping bracket 38 is slidably mounted on a linear support 42 by a part 44 which overhangs such support. This bracket also carries a depending portion 46 which is threadedly engaged with a screw shaft 48. This shaft 48 is rotatably supported at its ends as shown in FIG. 4 and a reversible motor mechanism 50 is coupled therewith to reversibly rotate the shaft to move the bracket and its supported discharge pipe 36 back and forth lengthwise of the shaft. This reciprocation of the discharge pipe 36 lengthwise of the shaft causes its discharge end to reciprocate lengthwise over the cylinder and flow solution completely over the surface of the cylinder during its rotation.

Figure 2:
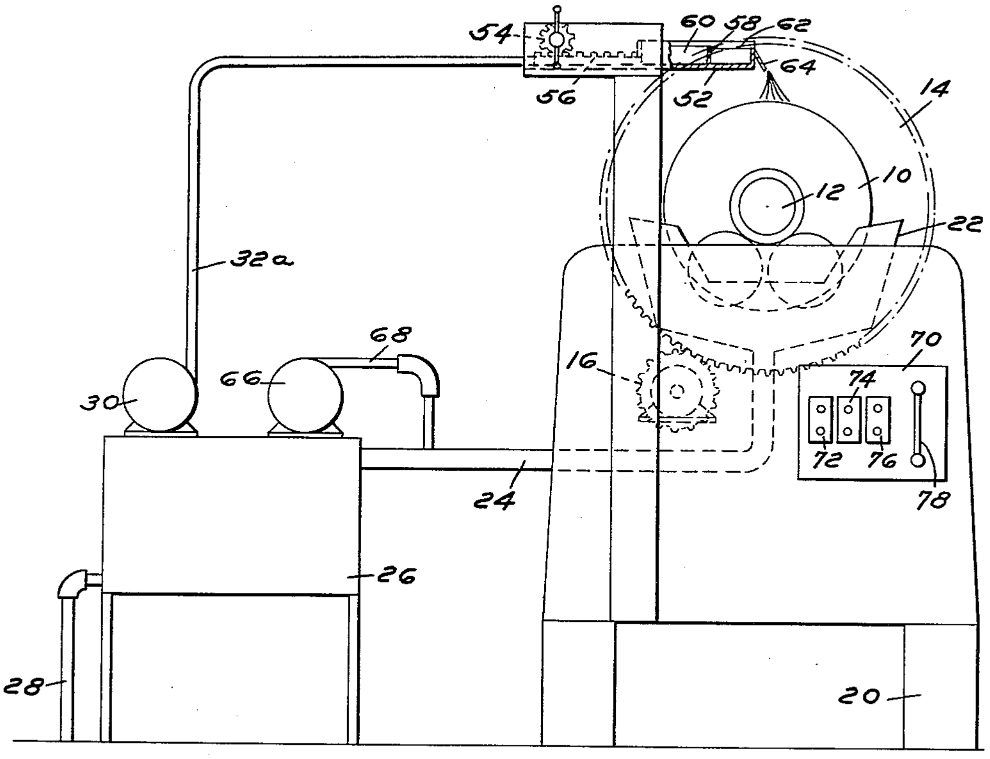
FIG. 2 is an end elevation of a modified form of apparatus.
Figure 3:
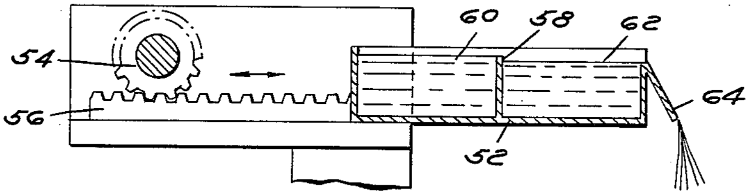
FIG. 3 is a fragmentary view of a portion of the solution-distributing apparatus shown in FIG. 2.

The construction in FIGS. 1 and 4 just described differs in a minor respect from the construction in FIG. 2 in that while the solution-collection trough and the tank are similar and there is a pump 30 which delivers solution through a line 32*a*, such solution is delivered to a discharge trough 52. This trough 52 extends the length of and overhangs the cylinder 10. The trough 52 is adjustable to the right and to the left as shown in FIG. 2 by means of a manually operable pinion 54 coupled with a rack 56. The trough 52 is divided into two compartments by a partition 58. There is a rear compartment 60 and a forward compartment 62. An apron 64 conducts the fluid from the forward compartment 62 so that it will spill as shown in FIG. 2 upon the top surface of the cylinder 10. The partition 58 serves as a baffle or weir so that the solution in the forward compartment 62 is quiet and the discharge therefrom is even.

In both FIGS. 1 and 2 liquid is withdrawn from the tank 26 by the pump assembly 30 and discharged either through the outlet pipe 36 or from the trough 52 onto the surface of the rotating cylinder 10. It is apparent that if desired the discharge pipe 36 might be released from its supporting bracket 38 and the pipe might be manually moved by an operator to flow liquid over the surface of the rotating cylinder.

A separate motor-driven pump assembly 66 is shown as supported upon the tank 26. This pump communicates with a suitable source of water supply not shown and water is delivered through a discharge line 68 into the line 24 which leads from the trough 22 to the tank 26. Each one of these pump assemblies, namely 30 and 66, is of a character whereby the discharge flow of liquid therefrom may be very carefully regulated or suitable valve mechanism may be provided to meter such flow as is desired. The operation of these pumps is electrically controlled by conventional electrical control mechanism and in FIGS. 1 and 2 a panel 70 is shown as mounted on the frame 20. There are two switch buttons 72 to start and stop the pump 30. There are two switch buttons 74 to start and stop the water pump 66. There is a switch plate carrying two buttons 76 to start and stop the rotation of the motor which drives the cylinder. There is an indicating glass 78 adapted to indicate whether water is being flowed through the pipe 68 from the pump 66 into the line 24 leading from the trough 22 to the tank 26. This control mechanism is standard structure.

The cylinder 10 as shown in FIG. 4 is illustrated as having a tissue resist 80 extending over a portion of its outer surface. It is apparent that in carrying out the process the cylinder may have one or more sheets of gelatin tissue resist applied thereto.

In carrying out this process a suitable etching solution is placed within the tank 26. This may be a salt solution such as ferric chloride of a standard strength such as 43° or 44° Bé. Such quantity of the solution as is necessary for carrying out the process will be deposited in the tank. The rotation of the cylinder is instituted and upon starting up of the pump 30 the solution is discharged to flow over the rotating cylinder as heretofore described in connection with the description of the structure shown in FIGS. 1 and 2. Etching solution of the strength named is permitted to flow over the rotating cylinder for a predetermined time period as, for example, two to five minutes. It is understood that this solution is recirculated. It drops from the cylinder into the trough 22. It flows from the trough 22 through pipe 24 back into the tank 26.

At the end of the predetermined time period for the flow of the maximum strength solution the water pump 66 is started and water of dilution is then discharged into the pipe 24 to mix with the solution and dilute the same. The functioning of the water pump 66 may be so preset that if water is delivered therefrom at a determined rate, the solution in the tank 26 will reach a Bé. reading of 38° and/or 39° in, say, fifteen or twenty minutes or whatever time period is desired. It is also understood that this Bé. reading may be set as desired. It will be seen that the diminishing strength of the solution decreases by infinitesimal degrees. There is no sharp jump from one Bé. reading to another but a very slow shading off of concentration.

After the constantly diminishing solution has been discharged over the rotating cylinder for the desired time period, water pump 66 will be stopped and then the solution at the diminished or minimum concentration which has been attained, which may be 39° Bé., will be permitted to flow over the rotating cylinder for that period of time necessary to complete the etching. This may be a time period of from two to five minutes. In certain plants a control patch of resist is applied to the surface of the cylinder and as this patch changes color under penetration of the solution, a determined change of color is used as a guide to indicate that a determined time short of completion of the etching process has been attained.

It is understood that the time period set forth may be varied. It is understood that the concentration of solution may be varied. It has been found, however, that, as compared with the old hand process referred to hereinabove, the instant process gives a uniformity and smoothness of gradation of tone which is highly desirable. The tone gradation as accomplished in the herein-described automatic process reproduces more accurately the tone coloring of the print being reproduced. It is also possible to vary this tone gradation by varying the time periods and/or etching solution concentrations. Heretofore in the hand application, etched-out particles of metal and used-up solution might collect in the cavities and prevent the fresh etching solution from acting as desired. It is understood that the cavities are very minute. The depth of the cavities might vary from, say, two microns to thirty microns, and a width of one hundred forty microns in conventional.

It is also understood that in the claims, wherever the word plate is used it is intended to cover either a flat plate or the circular surface of a cylinder.

FIGS. 6–10 show a preferred modification of the invention herein described. In the construction shown in these figures, the roll 100 is supported in the manner hereinabove described in FIGS. 1–5. The trough 102 differs in minor detail from the trough 22 hereinabove described. This trough 102 would probably be formed of plastic or some other material which is immune to the attack of the acidic etching solution as would the other parts of the machine shown herein or shown in the structure heretofore described. This solution discharge pipe 104 would be connected with the solution discharge 32*a*, from the pump 30 shown in FIG. 2 and the solution discharge mechanism shown in FIGS. 1, 2, and 3 would be eliminated.

This solution discharge pipe 104 is shown as entering the trough at both ends and extending linearly therealong through an extension portion 106. It would be supported from the side of the trough by brackets 108. The pipe itself is provided with liquid discharge apertures

110 through which liquid is discharged against the side of the trough to flow down into the bottom thereof.

Figure 6:
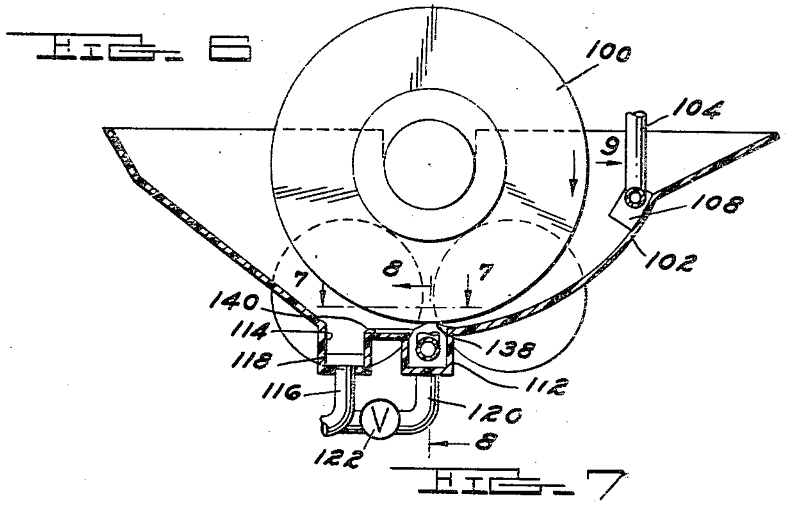
FIGS. 6–12 illustrate a modified form of this invention and FIG. 6 is a vertical sectional view taken transversely through the trough and showing an end of the cylinder in elevation.
Figure 7:
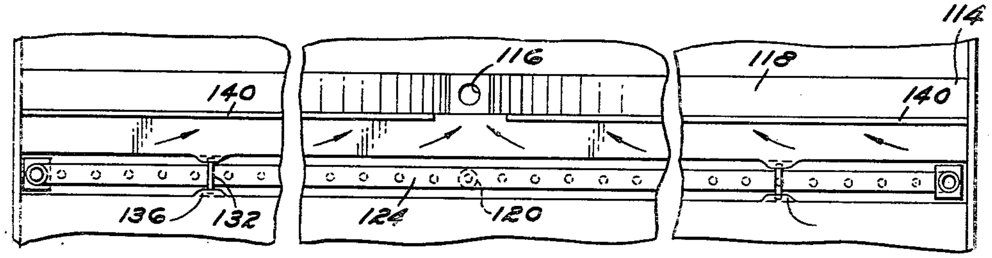

This trough is provided throughout its bottom portion and extending linearly thereof with a solution sump trough 112 and a solution sump discharge trough 114 as shown in FIG. 6. This solution sump discharge trough 114 has a discharge outlet 116 which would be connected with the discharge outlet 24 shown in FIG. 2 which extends from the trough 22 to the solution tank 26. The bottom of the sump discharge trough 114 slopes from each end toward the middle as at 118, and the discharge pipe 116 extends from the center portion thereof as shown in FIG. 7.

The solution sump trough 112 has a discharge outlet 120, which is normally closed by the valve 122. This outlet 120 empties into the discharge outlet 116 as shown in FIG. 6. During the normal operation of the device, the valve 122 is closed. When it is desired to completely drain the trough 102 and the trough 112, this valve 122 is opened. This would be when the use of the machine had been stopped.

The delivery of acidic etching solution from the source tank to the main trough 102 through the discharge pipe 104 is of such rate and the discharge line 116 is so proportioned that the level of etching solution maintained within the main trough 102 is normally three-eighths of an inch or thereabouts below the periphery of the roll 100. This space may vary from approximately one-quarter inch to one-half inch.

Figure 8:
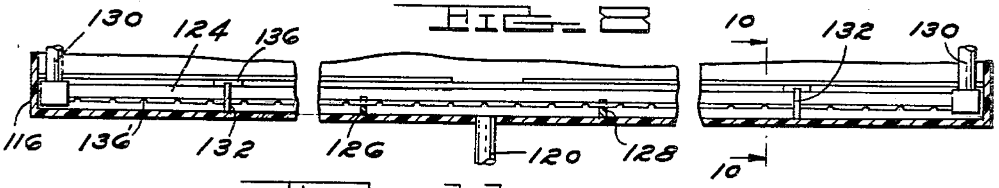
Figure 11:
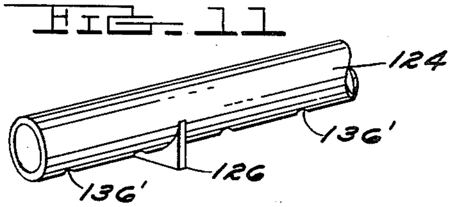
Figure 10:
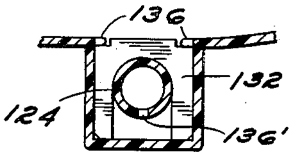
Figure 9:
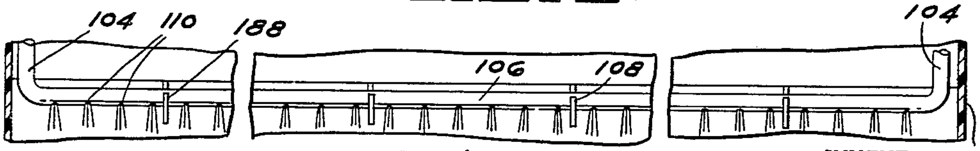

There is disposed within the sump trough 112 an air discharge pipe 124 which extends lengthwise of the sump trough 112 and is spaced above the bottom thereof by supports 125 as shown in FIGS. 9 and 11. This air discharge pipe is supplied with air from both ends through inlet branches 130 as shown in FIG. 8. The air pipe 124, which is held spaced above the bottom of the sump trough 112 by the supports 128 as hereinabove described, is held down by hold-down members 132 as shown in FIGS. 8 and 10. Such hold-down members are held downwardly against the pipe by flanges 136 as appears in FIG. 10. Such hold-down members are bifurcated as illustrated in FIG. 10 to be received over the pipe 124. This pipe 124 is provided with linearly spaced air discharge apertures 136′ as shown in FIGS. 10 and 11. The bottom of this trough 112 tapers from both ends toward the center so that when the valve 122 and the discharge pipe 120 is opened, the trough can be completely exhausted.

Figure 12:
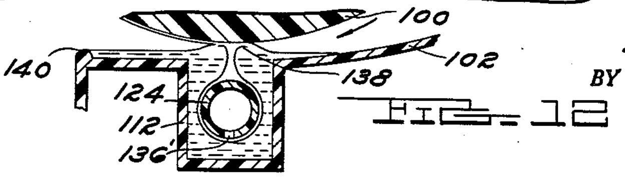

When this device of FIGS. 6–12 is placed in operation, instead of the solution being discharged upon the upper surface of the roll to flow thereover and downwardly into the collector trough as described in connection with FIGS. 1–5, the solution is bubbled up against the underside of the rotating roll as at 138 in FIG. 12. It is bubbled up thereagainst by air or other gaseous fluid issuing from the discharge apertures 136′ of the pipe 124. This air is first directed downwardly toward the bottom of the sump trough 102. It bubbles upwardly through the liquid solution. It forms a bubbly-like wave the crest of which is urged upwardly against the roll as at 138 as shown in FIG. 12. The solution level is maintained by a ridge 140 shown in FIGS. 6 and 7, which extends along the inner margin of the sump trough 114 in the construction shown in FIGS. 6–12 but obviously the interval partition between the sump troughs 112 and 114 might be of such a height that such ledge would be unnecessary.

It is desired, however, that the level of the etching solution within the sump trough and within the main trough 102 be maintained spaced below the periphery of the roll. It is desired that the etching solution be directed upwardly against the resist-covered surface of the periphery of the rotating roll from a level therebelow. Due to this fact the etching solution drops rapidly away from the roll and the roll does not therefore stand within the etching solution and it is kept relatively clean and free from undesired deposits of etching solution and metal.

During the operation of the machine, which, so far as the rotation of the roll and the delivery, discharge, and recirculation of liquid and dilution of liquid has been described in connection with the construction of FIGS. 1–5, the valve 122 is kept closed. The etching solution which flows from the collector trough 102 into the sump trough 112 is directed upwardly against the underside of the periphery of the resist-coated roll as hereinabove described. It drops back away from the roll and it flows into the sump trough 114 from where it is discharged through the outlet 116 back into the tank 26 as described in connection with the structure of FIGS. 1–5. The operation or process carried out by this apparatus is substantially the same as that carried out by the apparatus shown in FIGS. 1–5 except that in the first five figures the solution is discharged onto the upper side of the roll to flow thereover while in FIGS. 6–12 the solution is directed up against the underside of the roll to drop therefrom. As stated, to completely eliminate solution from the trough 102 and the sump troughs 112 and 114, the valve 122 is opened.

Throughout the specification and claims the solution is described as directed against or discharged upon or over the periphery of the rotating roll and such is intended to designate the process carried out in the first five figures and also in FIGS. 6–12.

What I claim is:

1. That process of rotogravure etching through the resist-covered surface of a copper plate which comprises applying continuously throughout a determined period of time an etching ferric chloride solution over the resist-covered surface of the plate in a controlled constantly diminishing concentration from a predetermined Bé. reading of substantially 43° or thereabouts to a Bé. reading of substantially 39° or thereabouts and then continuing the directing of the etching solution at such minimum concentration and without increasing its dilution for that period of time required to complete the etching of the plate.

2. That process of rotogravure etching through the resist-covered surface of a copper plate which comprises discharging for a determined period of time an etching ferric chloride solution having a Bé. reading of approximately 43° to 44° over such resist-covered surface of the plate and thereafter continuing such discharging of etching solution over the resist-covered surface of the plate at a controlled constantly diminishing Bé. reading until the Bé. reading reaches approximately 38° to 39° and then continuing such discharging at such lowest Bé. reading until the etching of the plate has been completed.

3. That process of rotogravure etching through the resist-covered surface of a copper cylinder and while rotating the cylinder which comprises directing an etching ferric chloride solution of a predetermined Bé. reading over such resist-covered copper surface and during the rotation of the cylinder throughout an initial predetermined time period, and then continuing such directing of etching solution over said resist-covered surface of the cylinder with a regulated constantly diminishing Bé. reading for an intermediate predetermined time period and until the concentration drops to a predetermined minimum Bé. reading and then continuing the directing of such etching solution at said minimum Bé. reading for that final period of time necessary to complete the etching of the surface of the cylinder.

4. That process of rotogravure etching through the resist-covered copper surface of a rotating cylinder as defined in claim 3 characterized in that the initial step of directing the etching solution at the highest Bé. reading is continued through a period of time varying from two to five minutes and the intermediate step of flowing the etching solution at a constantly diminishing Bé. reading is continued through a period of time varying from fifteen to twenty-five minutes, and the final step of directing the etching solution at the minimum Bé. reading is continued throughout a period of time varying from two to five minutes.

5. That process of rotogravure etching through the resist-covered surface of a copper cylinder while rotating the cylinder as defined in claim 3 characterized in that ferric chloride solution is directed over the resist-covered surface of the rotating cylinder throughout the initial predetermined time period at a Bé. reading varying from approximately 43° to 44° and is maintained for said predetermined initial time period approximately at such concentration, and the continued directing of etching solution over said resist-covered surface of the rotating cylinder throughout the intermediate time period is at a controlled constantly diminishing Bé. reading which drops to approximately 38° to 39°, and that the continued directing of etching solution over the resist-covered surface of the rotating cylinder throughout the final time period is at the minimum Bé. reading of approximately 38° to 39° reached during the intermediate time period and is continued until the etching is completed.

6. That process of rotogravure etching through the resist-covered surface of a metal plate as defined in claim 2 characterized in that the initial step of directing the etching solution at the highest Bé. reading is continued through a period of time varying from two to five minutes and the intermediate step of directing the etching solution at a constantly diminishing Bé. reading is continued through a period of time varying from fifteen to twenty-five minutes, and the final step of directing the etching solution at the minimum Bé. reading is continued throughout a period of time varying from two to five minutes and wherein the etching solution is continuously recirculated and during the carrying out of the second step of the process water of dilution is slowly and continuously added to the solution in a controlled quantity to reduce the Bé. reading slowly and continuously from the maximum reading set forth to the minimum reading set forth, and then such addition of water of dilution is discontinued and the third step of the process is carried out with the solution maintained at the minimum Bé. reading.

7. That process of rotogravure etching through the resist-covered copper surface of a rotating cylinder which comprises discharging an etching ferric chloride solution of a Bé. reading of approximately 43° to 44° from a solution tank against the resist-covered surface of the rotating cylinder and causing the same to drop from the cylinder into a collection trough, discharging the solution from the trough into a solution tank and continuously recirculating the solution in the tank to flow over the surface of the cylinder throughout the period of time occupied by the initial step of the process, and following such initial step by continuously adding water of dilution to the solution discharged from the trough into the tank continuously diminishing the Bé. reading of the solution in the tank and continuing the recirculation of the constantly diminishing Bé. solution from the tank and discharging the same over the resist-covered surface of the cylinder causing the solution to drop therefrom into the trough and continuing this intermediate step of the process for a period of time varying from fifteen to twenty-five minutes, and then discontinuing the addition of water to the solution but continuing to recirculate the weakened solution and discharging the same over the cylinder for a period of time approximating two to five minutes to complete the etching of the cylinder.

8. That process of rotogravure etching of a metal plate through a resist cover overlying a surface of the plate which comprises applying a ferric chloride etching solution over the resist cover to penetrate therethrough and etch the plate, and simultaneously diluting for a predetermined period of time said etching solution by the controlled addition of water thereto from one predetermined level of water content to a higher level of water content, and stopping the application of said etching solution when the desired degree of etching has been attained.

9. That process of rotogravure etching as defined in claim 8 characterized in that the application of said etching solution over the resist cover and simultaneous dilution of the solution by the addition of water thereto are carried out throughout an early stage in the process, and that following such early stage etching solution is then applied over the resist cover throughout a predetermined time period at a maximum higher level of water content.

10. That process of rotogravure etching as defined in claim 8 characterized in that preceding the application of said etching solution over the resist cover and simultaneous dilution of the solution by the addition of water thereto, and as an initial step in the process, etching solution at a predetermined minimum level of water content is applied over the resist cover for a predetermined period of time.

11. That process of rotogravure etching as defined in claim 10 characterized in that following said application of etching solution and simultaneous dilution by the addition of water thereto, and as a final step in the process, etching solution at a predetermined maximum level of water content is applied over the resist cover for a predetermined period of time.

12. That process of rotogravure etching as defined in claim 8 characterized in that the resist cover varies from one area to another in resistance to penetration of the etching solution therethrough and the increasing of the water content of the solution during its application to the resist cover is controlled to progressively increase penetration capacity of the solution through areas of the resist cover of progressively increasing resistance to penetration of the solution at its minimum dilution.

13. That process of rotogravure etching of a metal plate through a resist cover overlying a surface of the plate which cover varies from one area to another in resistance to penetration of an etching solution therethrough, which comprises applying a ferric chloride etching solution of a predetermined concentration over the cover for an initial predetermined time period to penetrate those areas of the resist which are least resistant to penetration and etch the metal thereunder, and then continuing the application of etching solution over said resist for an intermediate predetermined time period while simultaneously diluting said solution by the controlled addition of regulated amounts of water to increase its dilution from said initial concentration to a predetermined maximum dilution to progressively penetrate areas of said resist successively more resistant to penetration by the solution and etch those areas of the metal plate thereunder.

14. That process of rotogravure etching as defined in claim 13 characterized in that following dilution of the solution by controlled addition of water thereto until a maximum dilution is attained the application of etching solution at such maximum dilution is continued for a predetermined period time.

15. That process of rotogravure etching as defined in claim 8 characterized in that said metal plate is in the form of a cylinder which is rotated during the etching process, and said application of the ferric chloride etching solution is accomplished by introducing gas into said solution beneath the cylinder to bubble said solution upwardly against the underside of the rotating cylinder.

16. That method of etching the resist-covered surface of a metal rotogravure printing cylinder comprising: supporting the cylinder above a pool of etchant solution for rotation about a horizontal axis with the underside of the resist-covered surface of the cylinder disposed adjacent but spaced above the surface of the solution and out of contact therewith, rotating the cylinder about said axis, and introducing a gas into the pool of solution below the surface thereof and below and along the length of the cylinder to lift solution in the form of bubbles upwardly above the surface of the pool and into bubbling contact with the underside of the resist-covered surface of the rotating cylinder.

17. That method defined by claim 16 further characterized in that the gas introduced into the pool is initially directed toward the bottom of the pool whereby its direction reverses in the pool to bubble upwardly.

18. Apparatus for etching the surface of a cylinder supported for rotation above an etching solution comprising, in combination, an etching solution tank, a solution pump having an intake communicating with the solution tank to withdraw liquid therefrom and having a discharge outlet supported above the cylinder to discharge liquid thereupon, a collection trough disposed below the cylinder to catch liquid flowing off of the cylinder, a liquid discharge line leading from the trough into the tank to discharge solution from the trough into the tank, a water pump having an inlet communicating with a source of water to receive water therefrom and having an outlet communicating with a liquid solution line communicating with the solution tank.

19. Apparatus as defined in claim 18 characterized in that the discharge outlet from the solution pump is supported above the cylinder upon reciprocating means adapted to reciprocate the discharge outlet lengthwise of the cylinder for discharge thereupon.

20. Apparatus as defined in claim 18 characterized in that a liquid spill trough is supported above the cylinder extending lengthwise thereof, said spill trough provided with two compartments separated by a baffle wall, one compartment provided with a discharge element extending lengthwise of the cylinder and adapted to deliver liquid from the spill trough onto the cylinder throughout the length thereof, the discharge outlet from the solution pump leading into the other compartment to deliver liquid thereinto.

21. Apparatus for etching the resist-covered surface of a metal cylinder comprising, in combination: an elongate etching solution trough, means for supporting and rotating said cylinder above the trough but with the underside of the cylinder extending into the trough, means for delivering etching solution liquid from a source to said trough and maintaining the surface of solution in the trough spaced below the underside of the resist-covered surface of the rotating cylinder, means for introducing a gas into the liquid etching solution below the surface thereof and beneath the cylinder and along the length thereof to bubble solution upwardly against the underside of the resist-covered surface of the rotating cylinder including a pipe having gas escape orifice means disposed in the trough beneath the surface of the etching solution and beneath the line of bubbling contact of bubbling solution with said underside resist-covered surface of the cylinder.

22. Apparatus for etching the resist-covered surface of a metal cylinder as defined in claim 21 characterized in that means is provided for constantly withdrawing liquid solution from the trough and recirculating the same back into the trough, and means is also provided for constantly diluting etching solution as it is returned to the trough.

23. Apparatus for etching the resist-covered surface of a metal cylinder as defined in claim 21 characterized in that said pipe extends linearly along the bottom of the trough spaced thereabove and said gas escape orifice means are outlets in the underside of the pipe through which air is directed toward the bottom of the trough to bubble upwardly about the pipe through the solution lifting the solution in the form of bubbles upwardly against the underside of the rotating cylinder.

24. Apparatus for etching the resist-covered surface of a metal cylinder as defined in claim 23 characterized in that said trough through which the pipe extends is in the form of a sump trough communicating with a larger and main solution-containing trough which is disposed underneath the roll, and that said larger and main solution-containing trough is provided with a second solution-containing discharge trough portion which extends parallel to the sump trough portion and is adapted to receive liquid solution from the main trough and is provided with a discharge outlet for solution that communicates with the flow of liquid solution.

References Cited in the file of this patent

UNITED STATES PATENTS

| | | |
|---|---|---|
| 764,164 | Thorpe et al. | July 5, 1904 |
| 1,188,870 | Williamson | June 27, 1916 |
| 1,313,233 | Grass | Aug. 12, 1919 |
| 1,371,338 | Andresen | Mar. 15, 1921 |
| 2,523,018 | Henderson | Sept. 19, 1950 |
| 2,682,880 | Ozmina | July 6, 1954 |
| 2,684,892 | Saulnier | July 27, 1954 |
| 2,745,417 | Fielding | May 15, 1956 |
| 2,746,848 | Jones | May 22, 1956 |
| 2,885,810 | Kauschka | May 12, 1959 |
| 2,933,675 | Hoelzle | Apr. 19, 1960 |
| 2,989,384 | Allen et al. | June 20, 1961 |
| 2,997,049 | Thomas | Aug. 22, 1961 |